United States Patent
Airoldi

(10) Patent No.: US 9,203,283 B2
(45) Date of Patent: Dec. 1, 2015

(54) ROTOR ARRANGEMENT FOR A GENERATOR

(71) Applicant: Giovanni Airoldi, Vejle (DK)

(72) Inventor: Giovanni Airoldi, Vejle (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 364 days.

(21) Appl. No.: 13/852,470

(22) Filed: Mar. 28, 2013

(65) Prior Publication Data

US 2013/0257195 A1    Oct. 3, 2013

(30) Foreign Application Priority Data

Apr. 3, 2012    (EP) .................................. 12162964

(51) Int. Cl.
| | |
|---|---|
| *H02K 9/02* | (2006.01) |
| *H02K 1/27* | (2006.01) |
| *H02K 1/32* | (2006.01) |
| *H02K 1/28* | (2006.01) |
| *H02K 7/18* | (2006.01) |

(52) U.S. Cl.
CPC ............... *H02K 9/02* (2013.01); *H02K 1/2786* (2013.01); *H02K 1/32* (2013.01); *H02K 7/1838* (2013.01); *H02K 2201/03* (2013.01); *H02K 2213/03* (2013.01); *Y02E 10/725* (2013.01)

(58) Field of Classification Search
CPC ......... H02K 9/02; H02K 1/27; H02K 1/2786; H02K 1/28; H02K 1/30; H02K 21/22
USPC .................... 310/53, 156.12, 156.13, 156.16, 310/156.17, 156.19, 156.26
See application file for complete search history.

(56) References Cited

U.S. PATENT DOCUMENTS

| | | | | |
|---|---|---|---|---|
| 4,219,752 A | * | 8/1980 | Katou | ...................... 310/156.19 |
| 4,260,921 A | * | 4/1981 | Silver | ...................... 310/156.19 |
| 2007/0024060 A1 | * | 2/2007 | Bacon | .............................. 290/55 |

FOREIGN PATENT DOCUMENTS

| | | |
|---|---|---|
| DE | 102004031329 A1 | 1/2006 |
| EP | 1914864 A2 | 4/2008 |

\* cited by examiner

*Primary Examiner* — Michael Andrews

(57) ABSTRACT

Rotor arrangement for a generator is disclosed. The rotor arrangement includes a rotor including a number of circumferentially adjacently disposed magnetic elements, at least one axially extending spacer element is disposed between at least two circumferentially adjacently disposed magnetic elements.

7 Claims, 2 Drawing Sheets

ROTOR ARRANGEMENT FOR A GENERATOR

CROSS REFERENCE TO RELATED APPLICATIONS

This application claims priority of European Patent Office application No. 12162964.6 EP filed Apr. 3, 2012. All of the applications are incorporated by reference herein in their entirety.

FIELD OF INVENTION

The invention relates to a rotor arrangement for a generator, the rotor arrangement comprising a rotor having a number of circumferentially adjacently disposed magnetic elements.

BACKGROUND OF INVENTION

The operation of electric machines such as generators is accompanied by the generation of heat particularly originating from so called copper losses in the stator. In order to provide proper cooling of a respective electric machine, it is known to blow a gaseous cooling medium from the face sides of the electric machine into the air gap between the stator and the rotor of a respective electric machine. The gaseous cooling medium circulates in axial direction, i.e. axially along the air gap, and in radial direction, i.e. through respective radial channels or ducts within the stator, through the electric machine.

Thereby, the axial flow velocity of the gaseous cooling medium is inversely proportional to the radial flow velocity of the gaseous cooling medium. Hence, due to the fact that the axial flow velocity of the gaseous cooling medium usually gradually decreases from the face sides to the centre of the generator or stator respectively, the radial flow velocity in the radial channels or ducts disposed in the regions of its face sides is usually lower in comparison to the radial flow velocity in the radial channels or ducts disposed in the centre portions of the generator or stator, respectively.

This effect gives rise to an uneven axial distribution of the radial flow velocity of the gaseous cooling medium within respective radial channels or ducts and hence, negatively affects the cooling efficiency of the generator as a whole.

SUMMARY OF INVENTION

It is the object of the invention to provide an improvement in the cooling efficiency of a respective generator.

This is inventively achieved by a rotor arrangement as initially specified, which is characterised in that at least one axially extending spacer element is disposed between at least two circumferentially adjacently disposed magnetic elements.

The present invention is based on the idea to concertedly influence the axial flow velocity of a respective gaseous cooling medium or cooling gas flowing in the air gap between the rotor and a respective stator along the axial length of the rotor or a generator which is equipped with an inventive rotor arrangement by means of respective axially extending, particularly longitudinally, spacer elements which are disposed in between at least two circumferentially adjacently disposed magnetic elements, i.e. permanent magnets or the like, of the rotor.

Hence, the axial flow profile, i.e. particularly the axial flow velocity profile, of the cooling gas may be concertedly influenced or controlled aiming at an increase of the axial flow velocity in the axial centre region of the rotor or a stator being radially oppositely disposed relative to the rotor. In such a manner, i.e. by concertedly shaping the cross-section of the air-gap between the rotor and a stator, an even distribution of the axial flow velocity of the cooling gas may be accomplished which also leads to an even distribution of the radial flow velocity within respective radial channels or ducts of a respective stator since—as mentioned above—there is a correlation between the axial and the radial flow velocity of a respective cooling gas. All in all, the cooling efficiency of a respective generator which is equipped with an inventive rotor arrangement is improved since the cooling performance is more evenly distributed along its axial length.

The aforementioned effect is not only based on the mere provision of respective spacer elements in between respective circumferentially adjacently disposed magnetic elements, but on their concrete geometrical shape which is chosen to concertedly influence, i.e. particularly adapt the aerodynamic flow profile of a respective cooling gas to be essentially constant in axial direction, i.e. along the air-gap extending between the rotor and a respective stator being radially oppositely disposed relative to the rotor.

Regarding the number and arrangement of respective spacer elements arbitrary possibilities are given. Preferably, each circumferential gap between respective circumferentially adjacently disposed magnetic elements is provided with at least one respective spacer element. However it is also possible that certain circumferential gaps between respective circumferentially adjacently disposed magnetic elements may be left empty. Attachment of the spacer elements to the rotor, i.e. a rotor frame or the like may be established by gluing connections, welding connections, brazing connections, or screwing connections, for instance. It is also feasible to mechanically attach a spacer element to the rotor by means of corresponding form and/or force closure elements provided with the spacer element and the rotor. I.e., the connection between the spacer element and the rotor may be established by dove-tail connection, i.e. respective protrusions and corresponding recesses provided with the spacer element and the rotor, or the like. Respective recesses and protrusions may be built by machining the rotor and/or the spacer element, for instance.

Preferably, a spacer element has a plane base area attached to the rotor and at least one freely exposed inclination area which is inclined relative to the base area. Hence, the plane base area serves to provide a connection site for connecting the spacer element with the rotor, whereas the inclination area serves to actively influence the flow profile, i.e. particularly the axial flow velocity profile, of a respective cooling gas. Hence, the geometrical shape of the inclination area is chosen in such a manner so as to provide an even axial flow profile of the cooling gas. Hence, any concrete dimensions of a respective spacer elements as well as inclination angles have to be determined under consideration of a concrete constructive design of the rotor arrangement as well as a generator being equipped with the rotor arrangement.

Generally, the when cutting a respective spacer element in axial direction it is of advantage that the inclination area comprises two symmetrically, oppositely inclined inclination area sections so that the respective shape of the spacer element may be deemed as a double-wedge- or roof-like shape. However, single-wedge- or (essentially) triangular-shapes of a respective spacer elements are also feasible. This especially applies, when the axial dimensions of a respective spacer element are below the axial dimensions of the rotor, so that generally at least two respective spacer elements may be axially subsequently disposed in between two circumferentially adjacently disposed magnetic elements.

Hence, according to a preferred embodiment, a respective spacer element has a plane base area and two inclination areas which are inclined relative to the base area, whereby the inclination areas are oppositely inclined relative to the base area. In such a manner, an even axial and further radial flow profile of the cooling gas may be achieved. This embodiment is particularly advisable when blowing a cooling gas from both face sides of the generator in the air gap.

In order to establish the aforementioned double-wedge- or roof-like shape of a respective spacer element, it is preferred that, when emanating from two respective inclination areas, the inclination areas are arranged in such a manner that they build a tip portion at the axial centre of the spacer element. Hence, the height of a respective spacer element increases from its face sides towards its centre so that a tip portion is built. Thereby, since the spacer element is preferably a symmetrical component, the slopes of the respective inclination areas are preferably equal.

Yet, it is generally also possible that a spacer element is an asymmetrical component with respect to its axial centre. In such a manner, any differences between the flowing profiles of the cooling gas entering from the respective face sides of the generator or the rotor arrangement, respectively into the air-gap may be encountered. Hence, by considering the given flowing profile of the cooling gas entering the air-gap from both face sides of a specific generator construction for shaping the spacer element, a concerted control of the respective axial and radial flow velocities of the cooling gas in the air-gap may be attained.

The double-wedge- or roof-like shape of a respective spacer element also embraces essentially double-wedge- or roof-like shapes, i.e. the inclination areas may be interrupted by respective flat areas. Respective flat areas may be particularly provided in the axial centre region of a respective spacer element in order to force even more cooling gas through the radial channels in the region of the face sides of the generator, i.e. in the region of the axial ends of the air-gap.

Thereby, the respective inclination areas are inclined with an acute angle relative to the base area. Hence, the inclination angle is below 90° and usually lies in the range of 0.5-40°, particularly 1-10°, especially 1-2°. According to a concrete exemplary embodiment, a respective angle may be 1.4°.

Instead of integrally building a respective spacer element, it is also possible that a respective spacer element is built of or comprises at least two separate spacer element segments adapted to build the spacer element when assembled.

According to a simple embodiment, the spacer element segments may each represent a half of the complete spacer element, i.e. the spacer element is divided in two respective halves. When emanating from a spacer element having a double-wedge-like shape, each spacer element segment has the shape of a single wedge. To build the spacer element the vertically extending side planes of the respective spacer element segments are to be abutted so as to build the aforementioned double-wedge-like shape of the spacer element. Hence, a spacer element may be built of two, particularly cross-sectionally, symmetrical spacer element segments, with the spacer element segments having a cross-sectionally wedge-like shape.

Of course, a respective spacer element may also comprise more than two respective spacer element segments. Thereby, the shapes, i.e. particularly slopes of the respective inclination areas, of the respective spacer element segments are preferably adapted to each other so an appropriate effect on the flow profile of cooling gas may be achieved.

The present invention also relates to a generator, particularly for a wind turbine. The generator comprises a stator arrangement including stator and a rotor arrangement as specified above. All annotations regarding the inventive rotor arrangement also apply for the inventive generator.

BRIEF DESCRIPTION OF THE DRAWINGS

The invention is described in detail as reference is made to the figures, whereby.

DETAILED DESCRIPTION OF INVENTION

Figure 1:
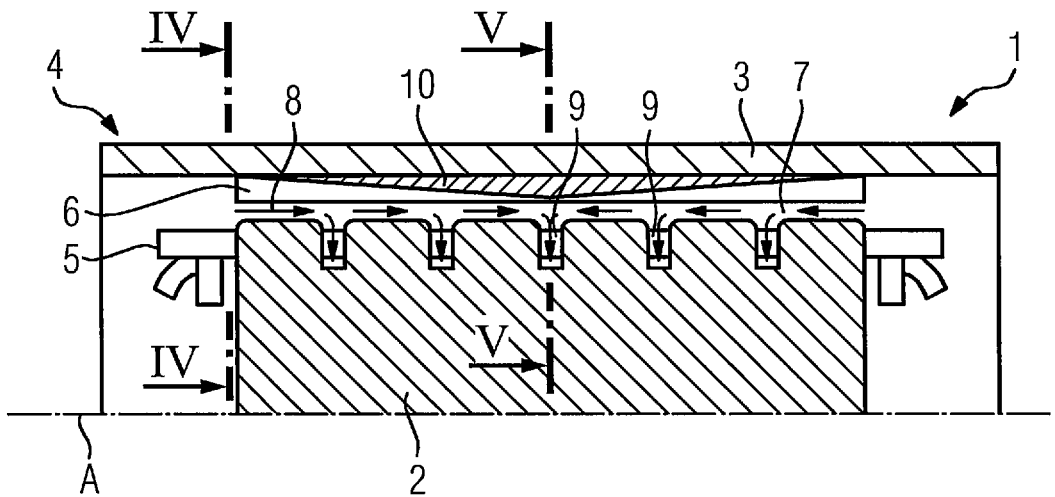
FIG. 1 shows a principle axially cut view of a generator.

FIG. 1 shows a principle axially cut view of a generator 1 such as particularly used as a power generating unit in a wind turbine. The generator 1 comprises a ring-shaped stator 2 and a ring-shaped rotor 3 as part of a rotor arrangement 4, with the rotor 3 being rotatably supported relative to stator 2 by means of appropriate bearing means so that the rotor 3 may rotate around the central axis A.

The stator 2 is provided with a number of stator windings 5, whereby only the end portions of the stator windings 5 axially extending off the stator 2 are shown. The rotor 3 is provided with a number of axially extending, bar-like magnetic elements 6 made of a permanent magnetic material.

The generator 1 is provided with a cooling means allowing air-cooling of the generator 1, i.e. the generator 1 is cooled by blowing a cooling gas, i.e. air for instance, from both face sides into the air-gap 7 extending between the rotor 3 and the stator 2. Therefore, the generator 1 comprises a number of fans or the like. The cooling gas extends in both axial and radial direction (cf. arrows 8), i.e. the cooling gas not only axially circulates through the air-gap 7 but also radially circulates through respective radial channels 9 are provided at defined axial positions along the axial length of the stator 2.

In order to actively influence the axial flow velocity of the cooling gas and hence, also the radial flow velocity of the cooling gas (since the axial flow velocity is inversely proportional to the radial flow velocity of the cooling gas), respective spacer elements 10 are provided with the rotor 3.

Figure 4:
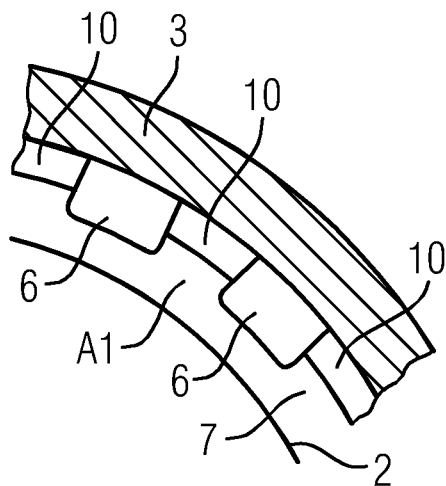
FIG. 4 shows a cut along line IV-IV in FIG. 1.
Figure 5:
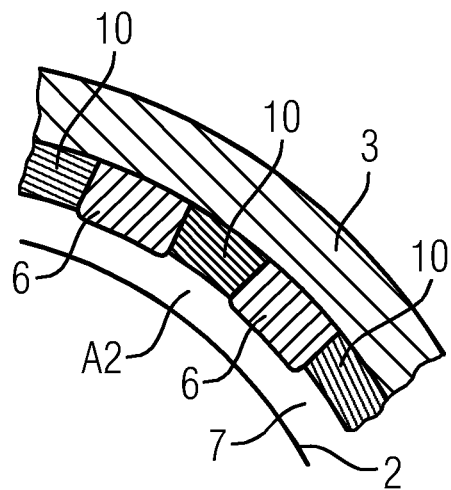
FIG. 5 shows a cut along line V-V in FIG. 1.

The spacer elements 10 are disposed in between circumferentially adjacently disposed magnetic elements 6, i.e. in between respective gaps or slots extending in between two respective circumferentially adjacently disposed magnetic elements 6 (cf. FIGS. 4, 5). Thereby, the dimensions of a respective spacer element 10 are typically adapted to both the circumferential and axial dimensions of a respective gap extending between two respective circumferentially adjacently disposed magnetic elements 6. The spacer element 10 may be attached to the rotor 3 by any suitable and stable connection holding the spacer elements 10 safely in place, i.e. particularly by gluing, welding, brazing, or screwing connections.

Figure 2:
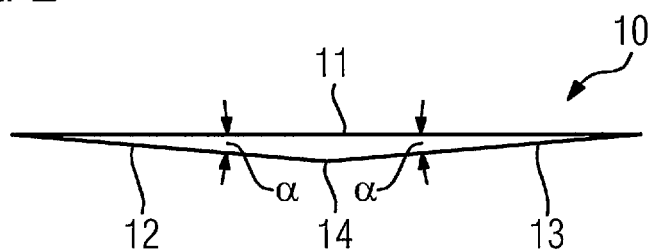
FIG. 2 shows a principle side view of a spacer element according to a first exemplary embodiment.

As is particularly discernible from FIG. 2 showing a principle side view of a spacer element 10 according to a first exemplary embodiment, the spacer element 10 has the shape of a double-wedge. Hence, a respective spacer element 10 is generally a symmetrical component having a plane base area 11 and two ramp-like, inclination areas 12, 13 which are inclined relative to the base area 11. Thereby, the respective inclination areas 12, 13 are inclined with an acute angle relative to the base area 11 (cf. inclination angles α). The inclination angles α may be 1.4°, for instance. The inclination areas 12, 13 are oppositely inclined relative to the base area 10 so as to form a tip portion 14 at the axial centre of the spacer element 10 giving the spacer element 10 the mentioned double-wedge or roof-like shape.

The specific shape of the spacer element 10 leads to a gradual change, i.e. decrease of the cross-section area of the air-gap 7 from the face sides of the generator towards its axial centre. In such a manner, the cross-section of the air-gap in the axial centre region of the generator may be reduced by ca. 25%, for instance (cf. the cross-sectional areas A1, A2 of the air-gap 7 shown in FIGS. 4, 5). Variations of the cross-section of the air-gap 7 may be mainly influenced by varying the inclination angles α of the inclination areas 12, 13.

Accordingly, the axial flow velocity of the cooling gas may be concertedly influenced in such a manner that the cooling gas flows slower in the axially outer portions than in the axial centre. Hence, it may be achieved that the radial flow velocity of the cooling gas is more evenly distributed along the axially disposed radial channels 9 so that the cooling efficiency of the cooling means may be improved. Known constructively cumbersome approaches for improving the cooling efficiency of the generator such as varying the axial dimensions of the radial channels 9 and/or increasing the number of the radial channels 9 are not necessarily required, yet in principle additionally possible. In such a manner, the problem of a pressure drop of the cooling gas within the radial channels 9 is not given with the inventive principle.

Figure 3:
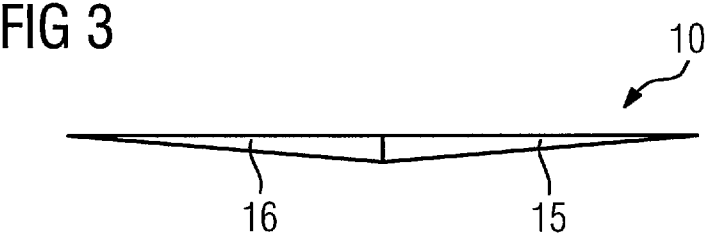
FIG. 3 shows principle side view of a spacer element according to a second exemplary embodiment.

Instead of a respective spacer element 10 being an integral component, it is also possible that a respective spacer element 10 may be a segmented component. FIG. 3 shows a principle side view of a spacer element 10 according to a second exemplary embodiment. Thereby, the spacer element 10 comprises two separate spacer element segments 15, 16 adapted to build the spacer element 10 when assembled. The embodiment of FIG. 3 shows two respective symmetrical spacer element segments 15, 16 both having a wedge-like shape so as to build the aforementioned double-wedge-like shape of the spacer element 10 when assembled or abuttingly disposed, i.e. with their respective opposing face sides abutting each other.

Likewise, a respective spacer element 10 may also be divided in more than two respective spacer element segments 15, 16. Thereby, arbitrary configurations are possible under premise that the respective spacer element segments are shaped in such a manner that, when assembled, the desired double-wedge-shape of the spacer element 10 may be obtained.

Although the present invention has been described in detail with reference to the preferred embodiment, the present invention is not limited by the disclosed examples from which the skilled person is able to derive other variations without departing from the scope of the invention. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A rotor arrangement for a generator, the rotor arrangement comprising:
a rotor including a plurality of circumferentially adjacently disposed magnetic elements; and
an axially extending spacer element disposed between at least two circumferentially adjacently disposed magnetic elements;
wherein the axially extending spacer element includes a plane base area attached to the rotor and includes a freely exposed inclination area which is inclined relative to the base area, wherein the axially extending spacer element further includes two inclination areas which are inclined relative to the base area; and
wherein the two inclination areas are inclined in an axial direction in such a manner that they build a tip portion at the axial centre of the spacer element.

2. The rotor arrangement according to claim 1,
wherein the two inclination areas are oppositely inclined relative to the base area.

3. The rotor arrangement according to claim 2,
wherein the two inclination areas are inclined with an acute angle relative to the base area.

4. The rotor arrangement according to claim 1,
wherein the axially extending spacer element is built of a plurality separate spacer element segments adapted to build the spacer element when assembled.

5. The rotor arrangement according to claim 4,
wherein the axially extending spacer element is built of two, particularly cross-sectionally, symmetrical spacer element segments, with the spacer element segments having a cross-sectionally wedge-like shape.

6. The rotor arrangement according to claim 1,
wherein an axially extending spacer element is disposed between all circumferentially adjacently disposed magnetic elements.

7. A wind turbine generator, comprising:
a stator; and
a rotor arrangement according to claim 1.

* * * * *